(12) United States Patent
Yost et al.

(10) Patent No.: US 6,180,047 B1
(45) Date of Patent: Jan. 30, 2001

(54) METHOD OF PRODUCING A PATTERN MOLD

(75) Inventors: Thomas E. Yost, Prescott; Paul N. Latulippe, Jr., Chino Valley, both of AZ (US)

(73) Assignee: Sturm, Ruger & Company, Inc., Southport, CT (US)

(*) Notice: Under 35 U.S.C. 154(b), the term of this patent shall be extended for 0 days.

(21) Appl. No.: 09/207,104

(22) Filed: Dec. 7, 1998

Related U.S. Application Data (60) Division of application No. 08/931,773, filed on Sep. 16, 1997, now Pat. No. 5,908,643, which is a continuation-in-part of application No. 08/891,435, filed on Jul. 10, 1997, now abandoned, which is a continuation of application No. 08/662,900, filed on Jun. 12, 1996, now abandoned.

(51) Int. Cl.[7] .................................................. B29C 39/04
(52) U.S. Cl. ........................ 264/328.1; 264/334; 249/64; 425/DIG. 58
(58) Field of Search ................................ 264/328.1, 318, 264/297.2, 297.3, 297.6, 297.7, 328.9, 328.11, 328.2; 164/340, 341, 342, 246, 30; 249/63, 64, 175–177; 425/185, 186, 190, 192 R, 441, 468, DIG. 5, DIG. 10, DIG. 58

(56) References Cited

U.S. PATENT DOCUMENTS

| | | |
|---|---|---|
| 3,930,780 | 1/1976 | Lovejoy . |
| 4,160,635 | 7/1979 | Ikeda . |
| 4,196,884 * | 4/1980 | Zeman ................................. 264/318 |
| 4,205,950 * | 6/1980 | Suss et al. ........................... 264/318 |
| 4,842,243 | 6/1989 | Butler . |
| 4,872,637 | 10/1989 | VanRens . |
| 4,993,475 | 2/1991 | Yamada . |
| 5,033,530 | 7/1991 | Egoshi et al. . |
| 5,066,213 | 11/1991 | Ferincz . |
| 5,112,207 * | 5/1992 | Pinsonneault ....................... 264/318 |
| 5,204,046 | 4/1993 | Schmidt . |
| 5,209,889 * | 5/1993 | Brown et al. ..................... 264/297.7 |
| 5,350,002 | 9/1994 | Orton . |
| 5,417,559 | 5/1995 | Schmidt . |
| 5,445,511 | 8/1995 | Ito et al. . |
| 5,731,014 | 3/1998 | Travaglini . |
| 5,879,611 * | 3/1999 | Takahashi et al. .................. 264/318 |
| 5,895,621 * | 4/1999 | Tajiri et al. .......................... 264/318 |

OTHER PUBLICATIONS

Whelan, Injection Moulding Machines, Elsevier Applied Science Publishers, pp. 251–252, 1984.*

* cited by examiner

*Primary Examiner*—Jill L. Heitbrink
(74) *Attorney, Agent, or Firm*—Pennie & Edmonds LLP (57) ABSTRACT

An injection mold for forming a pattern for use in investment casting having mold sections carrying two pattern-forming surfaces and a translatable third pattern-forming element movable on a mold section. The mold also includes an inner core. Parting lines are located at inconspicuous locations by sizing and shaping the mold sections. The method of use of the injection mold includes employing an arrangement for facilitating lower mold section and for raising the inner core to facilitate its removal.

6 Claims, 14 Drawing Sheets

METHOD OF PRODUCING A PATTERN MOLD

RELATED APPLICATIONS

This application is a divisional of an application filed Sep. 16, 1997 entitled "Injection Mold For Producing A Pattern And Method of Mold Use" Ser. No. 08/931,773 which U.S. Pat. No. 5,908,643 which application in turn was a continuation-in-part of an application filed Jul. 10, 1997 having the same title, Ser. No. 08/891,435 which in turn was a continuation of U.S. application Ser. No. 08/662,900 filed Jun. 12, 1996, also of the same title both are abandoned.

BACKGROUND OF THE INVENTION

Aluminum molds for making wax patterns have been in use for years. Combination aluminum and epoxy molds have also been used. Epoxy mold parts have the drawback of wearing after repeated use and of being easily damaged during the handling required to carry out repeated molding operations. Additionally, it is well known that aluminum molds have superior heat transfer relative to epoxy molds, thereby reducing dwell time for wax pattern production and overall cycle time.

Where molded parts have included an intricate interior cavity, a plurality of mold sections and cores have been required. The mold parts and cores require handling to accomplish assembly and disassembly. Further, in the molding of demanding shapes such as golf club heads parting lines have presented problems requiring trimming and reworking wax patterns. Prior wax patterns for making golf club heads are disclosed in U.S. Pat. Nos. 5,204,046 and 5,417,559.

SUMMARY OF THE INVENTION

In summary, the present invention comprises a multi-section mold including an inner cluster core which novel mold is shaped and proportioned to facilitate handling during molding operation. Mold manipulation by hand is limited to sliding and translating of mold sections and the removal and replacement of the cluster core.

Preferably, the mold is connected to and operated with a mold press which includes a work station and a preparation station into which a lower mold portion is slidably mounted with inner cluster core in place and the upper mold section is lowered against the lower section. After injection of wax and cooling, the upper section is raised, the lower section is slidably moved out of the work station to the preparation station and a third mold portion is translated in its open position. Finally, the cluster core is removed.

As a feature, it is contemplated that, as the lower section is moved out of the work station, the core along with the wax pattern may be automatically raised to facilitate pattern and core removal. The mold is made of aluminum.

DESCRIPTION OF THE PREFERRED EMBODIMENTS

Figure 1:
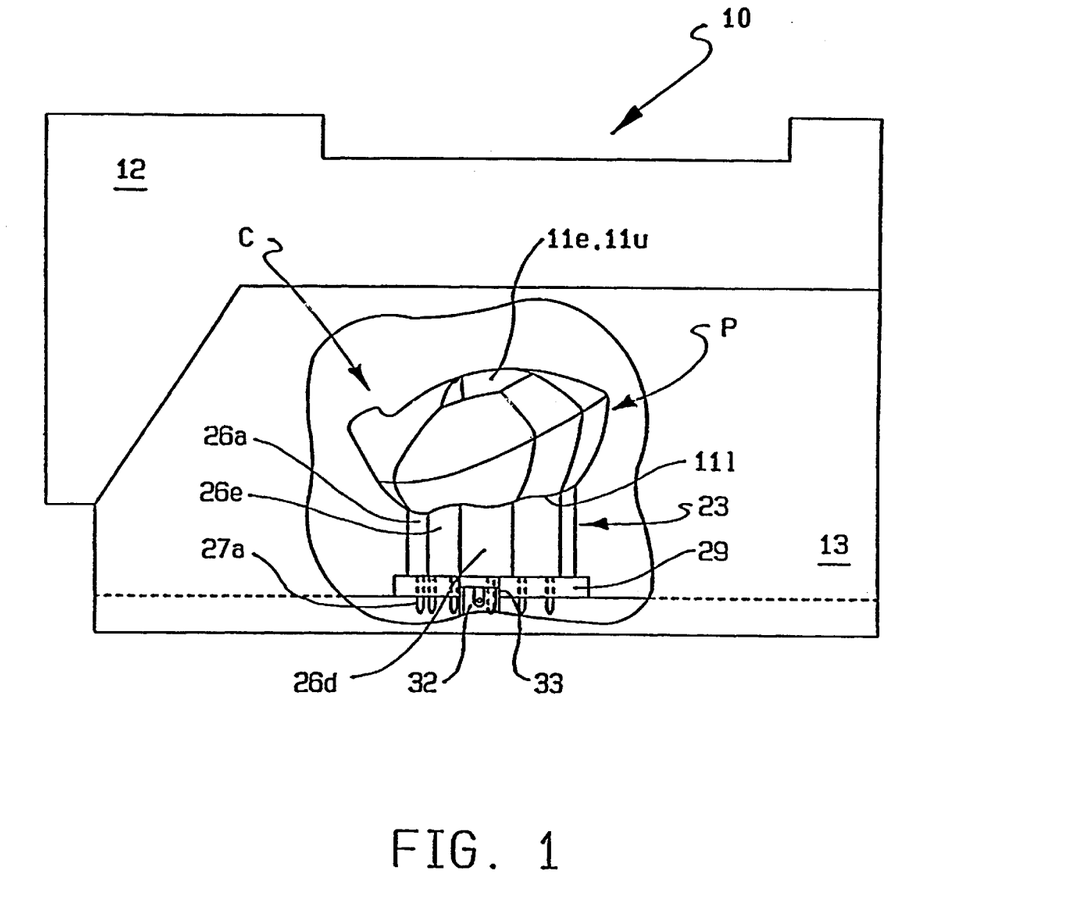
FIG. 1 is a side elevational view of the upper and lower mold portions assembled with a removable core cluster.
Figure 4:
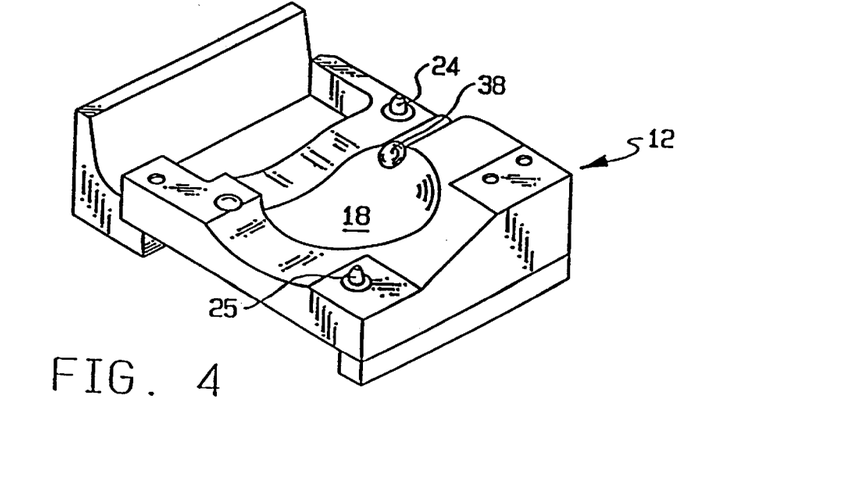
FIG. 4 is a perspective view of the upper mold portion.
Figure 5:
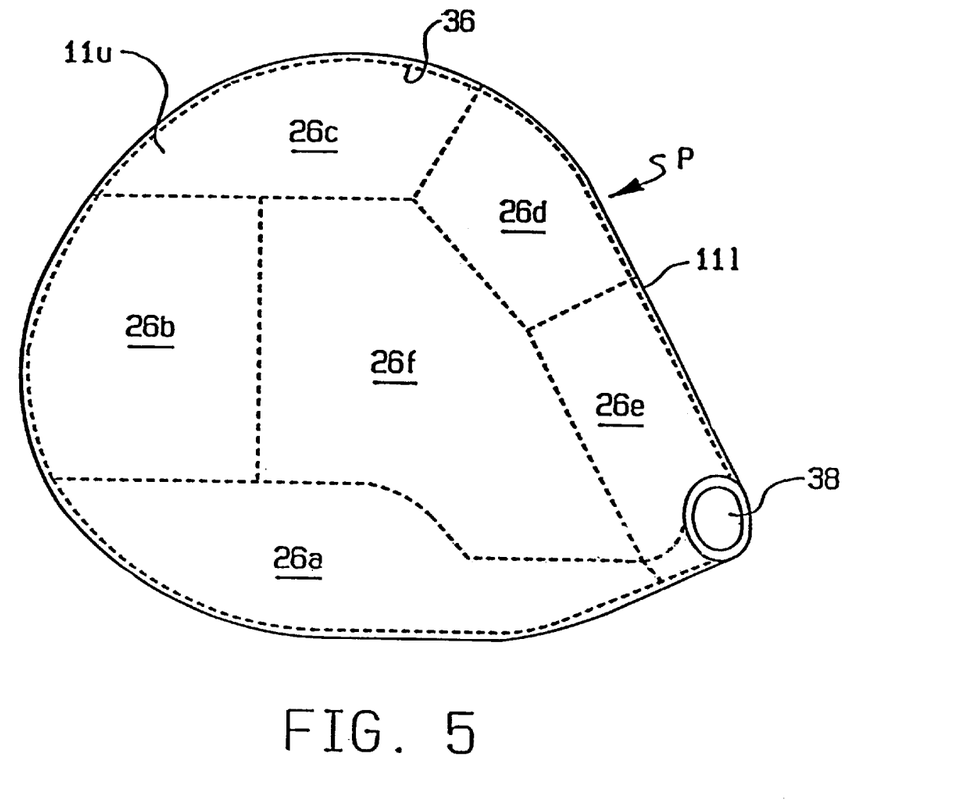
FIG. 5 is a plan view of the pattern mold with parting lines and with the cluster of cores therein and with the wax pattern, not shown, surrounding the core cluster.
Figure 6:
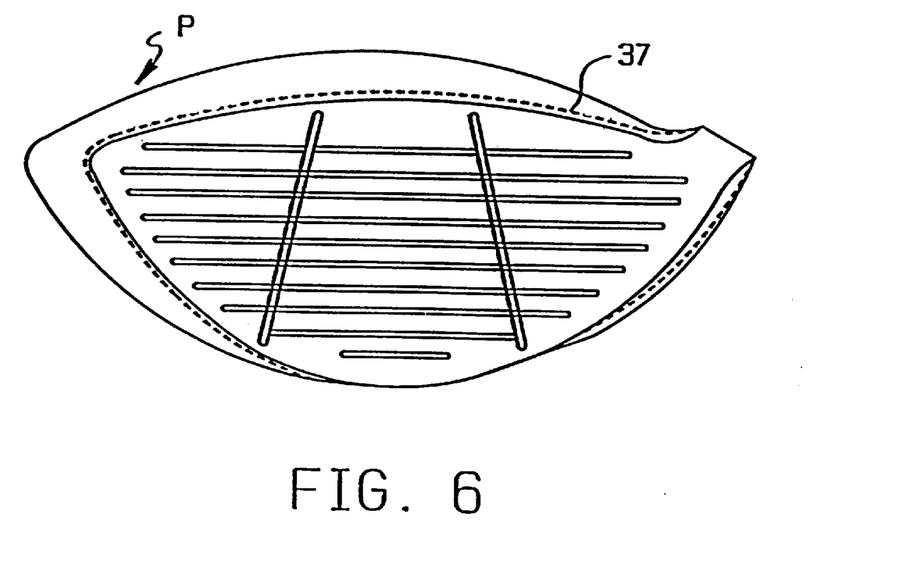
FIG. 6 is a front elevational view of the pattern mold including parting lines with the wax pattern not shown.

In the Figures, pattern forming mold unit 10 functions to mold a wax molded pattern P having an exterior surface 11e and an interior surface 11l (see FIG. 5) which pattern P is used in investment casting of a metal part such as a portion of golf club head (see FIGS. 1, 5 and 6). Mold 10 includes four (4) pattern-shape determining portions which create mold cavity C: The first portion is upper mold portion 12; the second is lower mold portion 13; and the third is a slidable mold portion 16 mounted for horizontal slidable movement on lower portion 13 and the fourth portion is the core cluster 23 (see FIGS. 1, 3, 3A and 4). Upper mold portion 12 includes cavity surface 18 which defines upper surface 11u of molded pattern P (not shown) (see FIG. 5). The lower mold portion 13 includes a cavity surface 19 which defines a portion 11l of the lower surface of the molded pattern P. Finally, face surface 21 of slidable mold portion 16 defines the remainder of the exterior surface of pattern P. Face surface 21 includes groove forming stand ups 21g.

Figure 7:
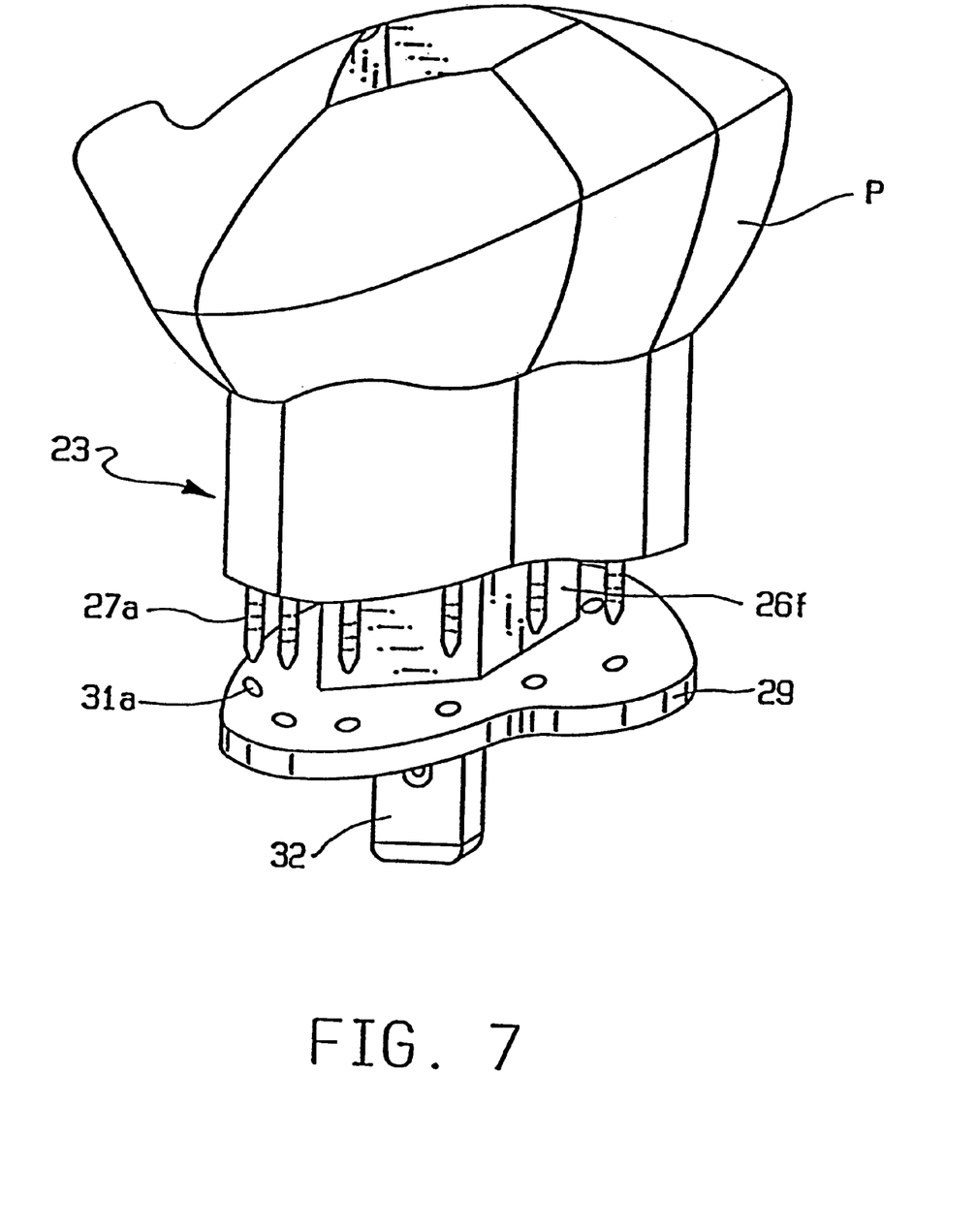
FIG. 7 is an expanded perspective view of the core cluster and mount ring.

Mold 10 also includes a core cluster 23 which is composed of six (6) core sections 26a–f with core section 26f being the center core section (see FIG. 5). Each core section 26a–f has receiving pins 27a–f respectively (FIGS. 1, 5 and 7). The core cluster 23 is positioned in mount ring 29 having holes 31a–f for receiving pins 27a–f. Attached to ring 29 and extending from it is locator prong 32 which fits into mold slot recess 33 to locate core cluster 23.

Figure 2:
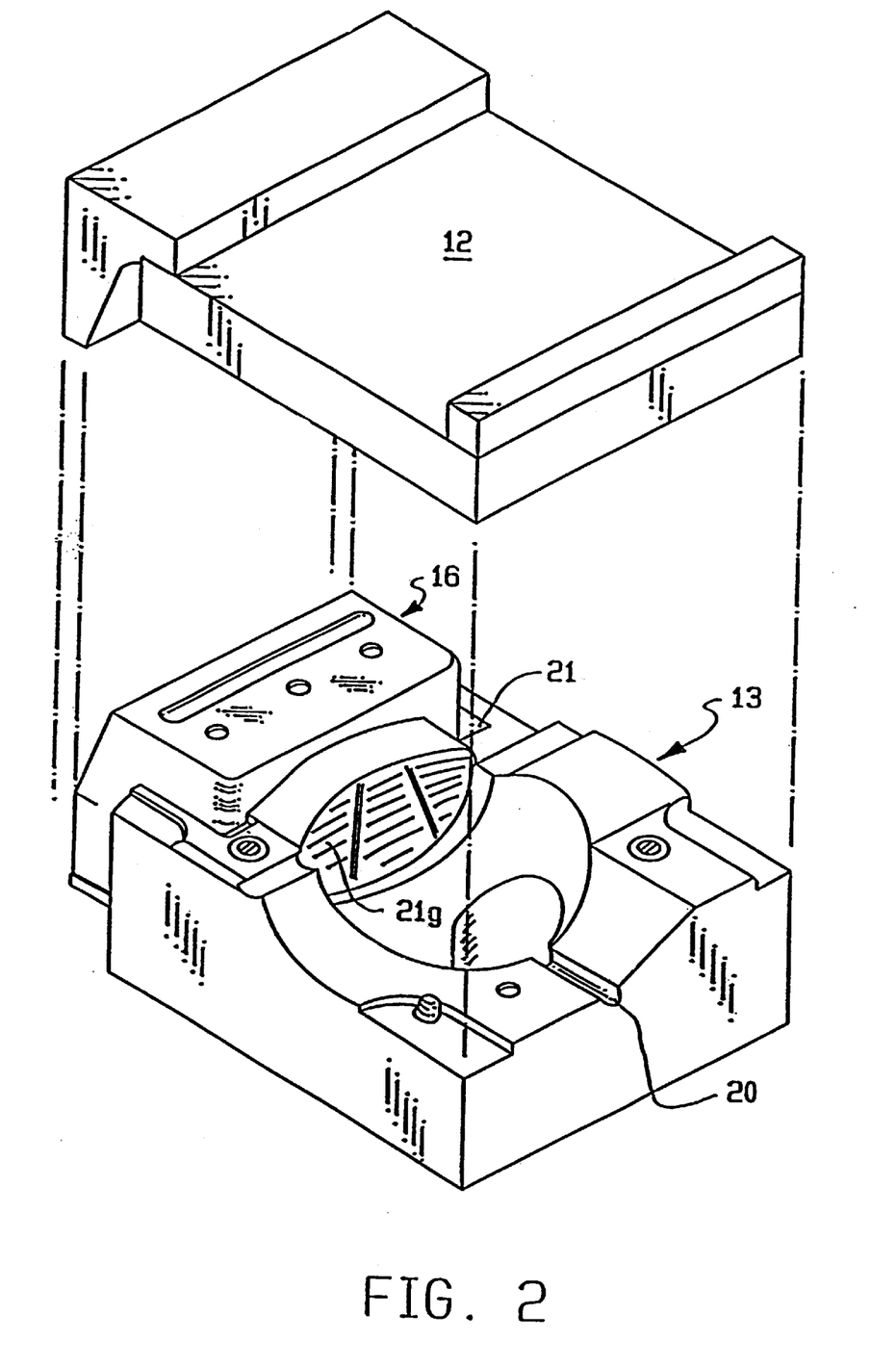
FIG. 2 is a perspective view of the upper and lower portions separated with the core cluster removed.
Figures 3, 3A, 3B:
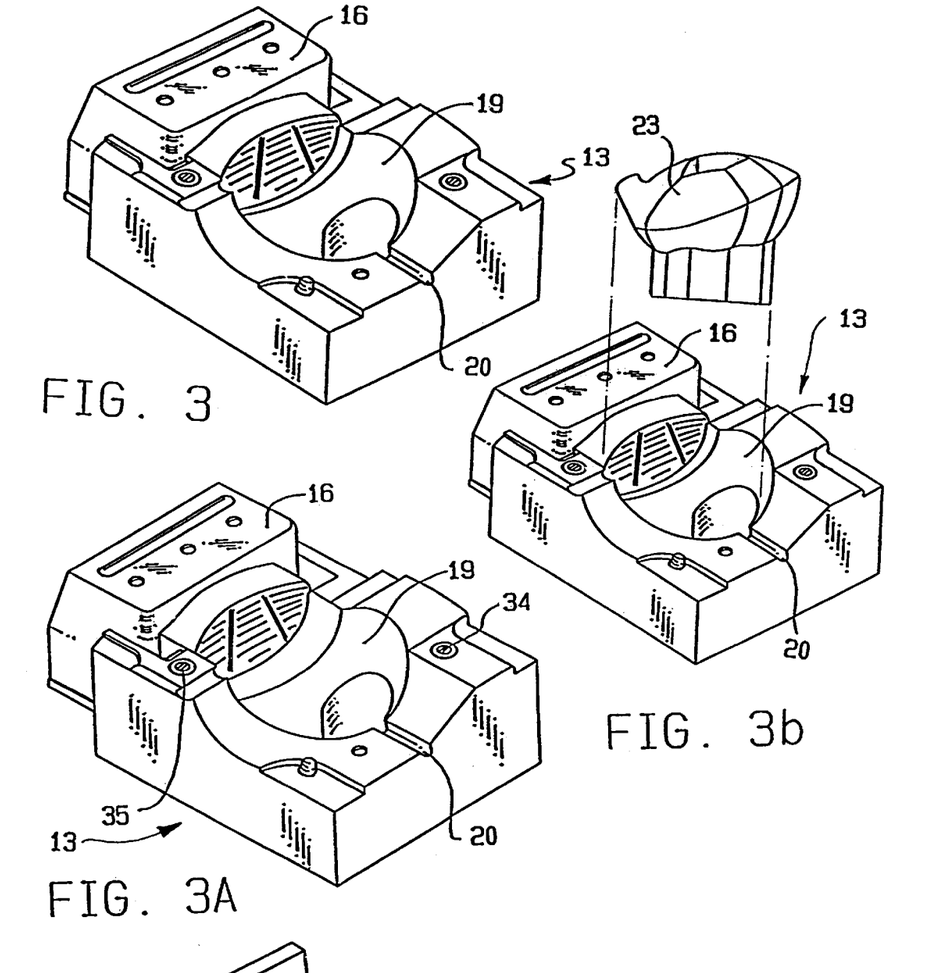
FIG. 3 is a perspective view of the lower mold portion showing the lower mold cavity and slidable third mold portion in its closed position.
FIGS. 3A and 3B are views similar to FIG. 3 with the third mold portion slid open.

Referring now to FIGS. 2, 3 and 4, the size and shape of pattern P is defined by upper mold portion cavity surface 18, lower mold portion cavity surface 19 and face surface 21g of slidable mold portion 16. The parting lines created by mating of cavities 18, 19 and face surface 21 are crown periphery parting line 36 (see FIG. 5) and face periphery parting line 37 (see FIG. 6). These parting lines 36, 37 are located on pattern P such that they are inconspicuous and therefore little or no reworking of molded pattern P is necessary to assure that the mold product made using pattern P has no conspicuous imperfections. Also shown is wax injection port 20.

Figure 8:
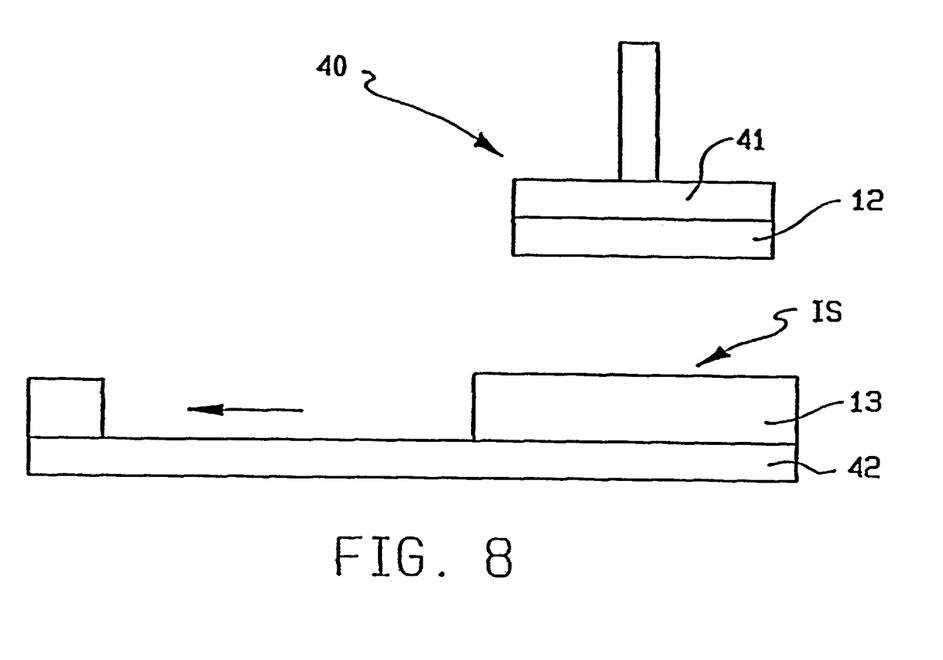
FIG. 8 is a front elevational view of the press and mold apparatus with the lower mold in its injection position.
Figure 9:
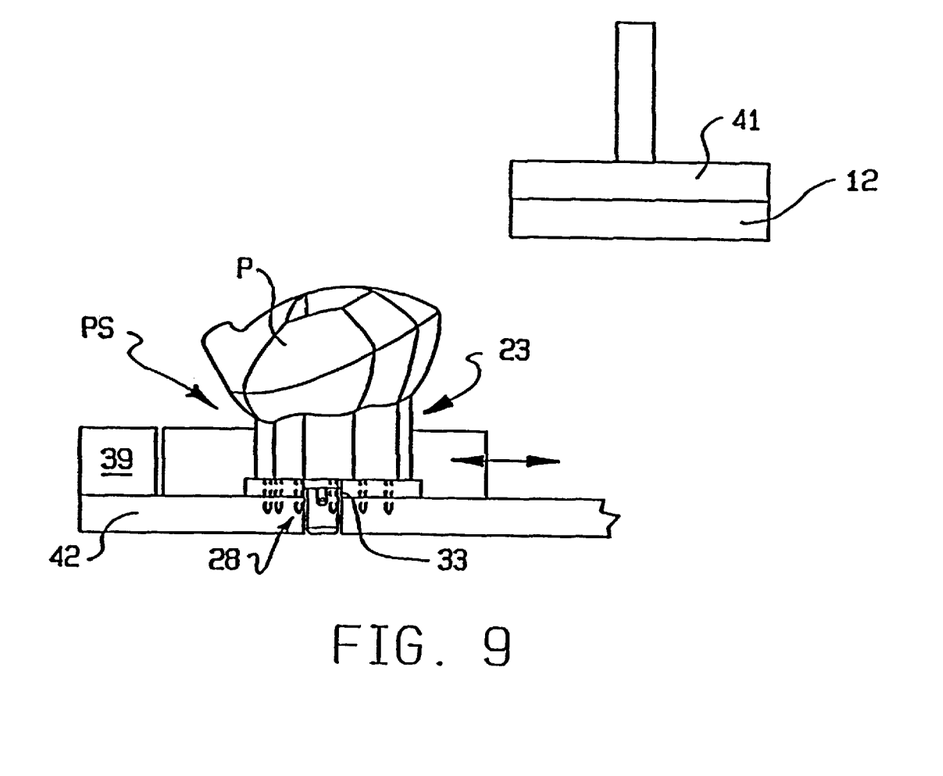
FIG. 9 is a view similar to FIG. 8 with the lower mold in its assembly preparation station.

Turning to FIGS. 8 and 9, mold 10 portions 12 and 13 are positioned for use in a mold press 40 having reciprocating platen 41 movable up and down. Upper mold portion 12 is attached to platen 41. Below reciprocating platen 41 press base 42 supports lower mold portion 13 shown resting in its injection position in FIG. 8 and in its assembly position in FIG. 9).

Lower mold portion 13 is mounted on guide rails (not shown) for ease of horizontal translation on base 42 from its injection station (IS) to its assembly preparation station (PS).

In the operation of mold press 40, lower mold portion 13 is translated horizontally by an operator to preparation station (PS) where the slidable mold portion 16 is moved away from mold surface 19. Cluster of cores 23 are placed in mount ring 29 which ring 29 is mounted and located by insertion of prong 32 in recess 33 in lower mold portion 13. Next, slide mold portion 16 is moved to its injection position. Lower mold portion 13 is translated to its injection station (IS).

Reciprocal platen 41 carrying upper mold portion 12 is then lowered to engage with lower mold portion 13. Alignment pins 24, 25 on upper portion 12 enter alignment holes 34, 35. of lower portion 13. The hosel hole core pin (not shown) is inserted in cavity C to form hosel opening 38 (FIG. 4). Pressure is exerted to hold the mold portions 12, 13 together as wax is injected in the pattern forming cavity C.

After a suitable cooling period for the wax to solidify, the hosel core pin is retracted and then the reciprocal platen 41 carrying the upper mold portion 12 is raised and the lower mold portion 13 is translated from the injection station (IS) to the preparation station (PS). As the lower mold section is retracted toward the operator, the core cluster is moved automatically upward about one-half an inch by means of a wedge or cam device not shown, thereby improved ease of core cluster disassembly. Slide 16 is moved away from both cluster 23 and pattern P. The mount ring 29 including pattern P is then grasped by operator, lifted out of the mold 13 and placed on a stand (not shown). A second mount ring and core cluster unit are placed in lower mold portion 13, mold portion 16 is moved into molding position, lower mold portion 13 translated back to its injection station (IS) and the press mold 40 is ready for the next cycle. The operator holds the wax pattern in one hand and lifts out the core cluster pieces 26a–f, then the core cluster 23 is reassembled for use in the next injection cycle.

An identification piece with marking on it may be placed in mold cavity C causing corresponding markings to appear on the wax pattern P.

Figure 10:
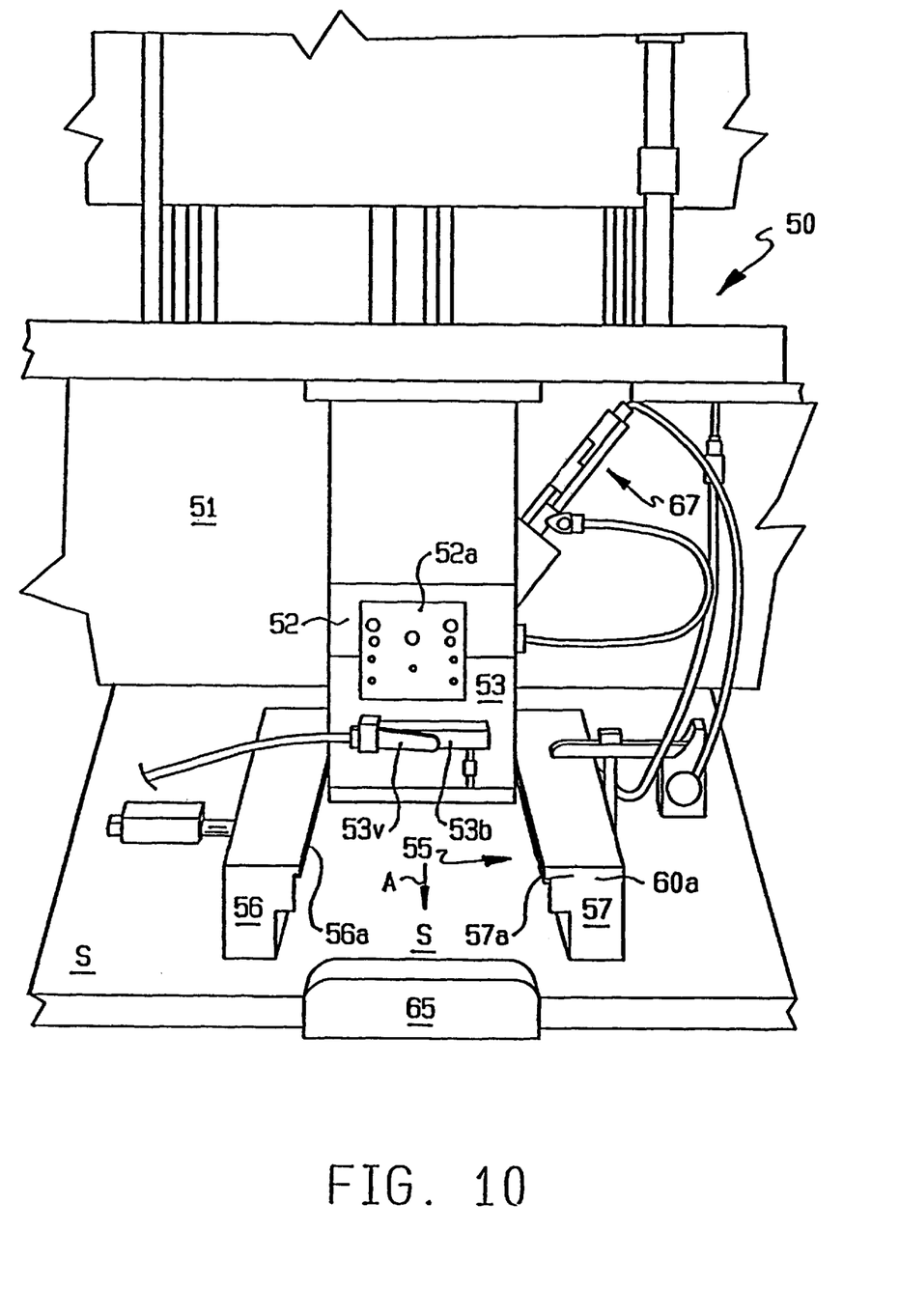
FIG. 10 is a front elevational perspective view of an alternative embodiment of the mold apparatus of the invention including the upper mold, the lower mold and the lower mold guide track.
Figure 11:
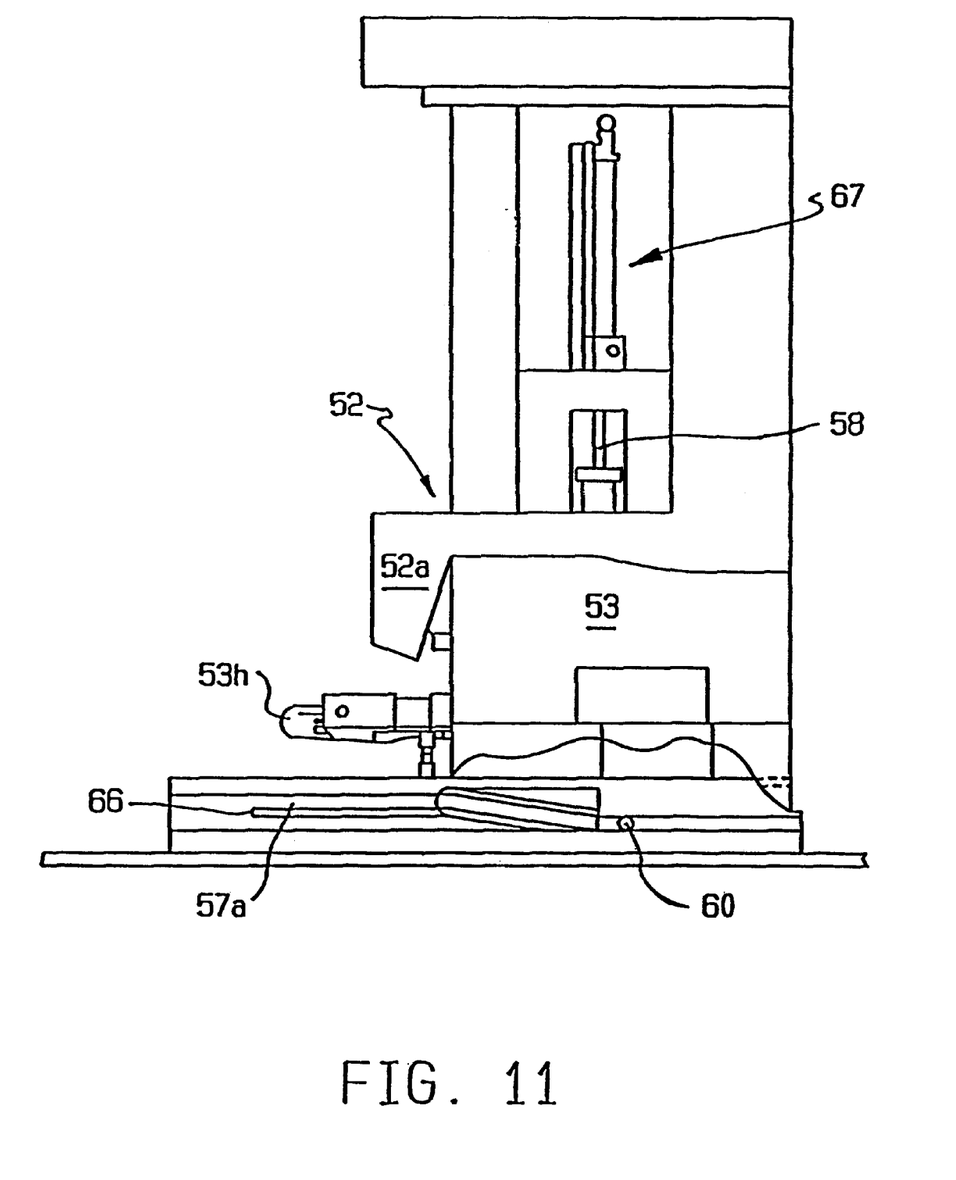
FIG. 11 is a side elevational view partially broken away showing the apparatus assembled and one of the track's slotted rails.
Figure 12:
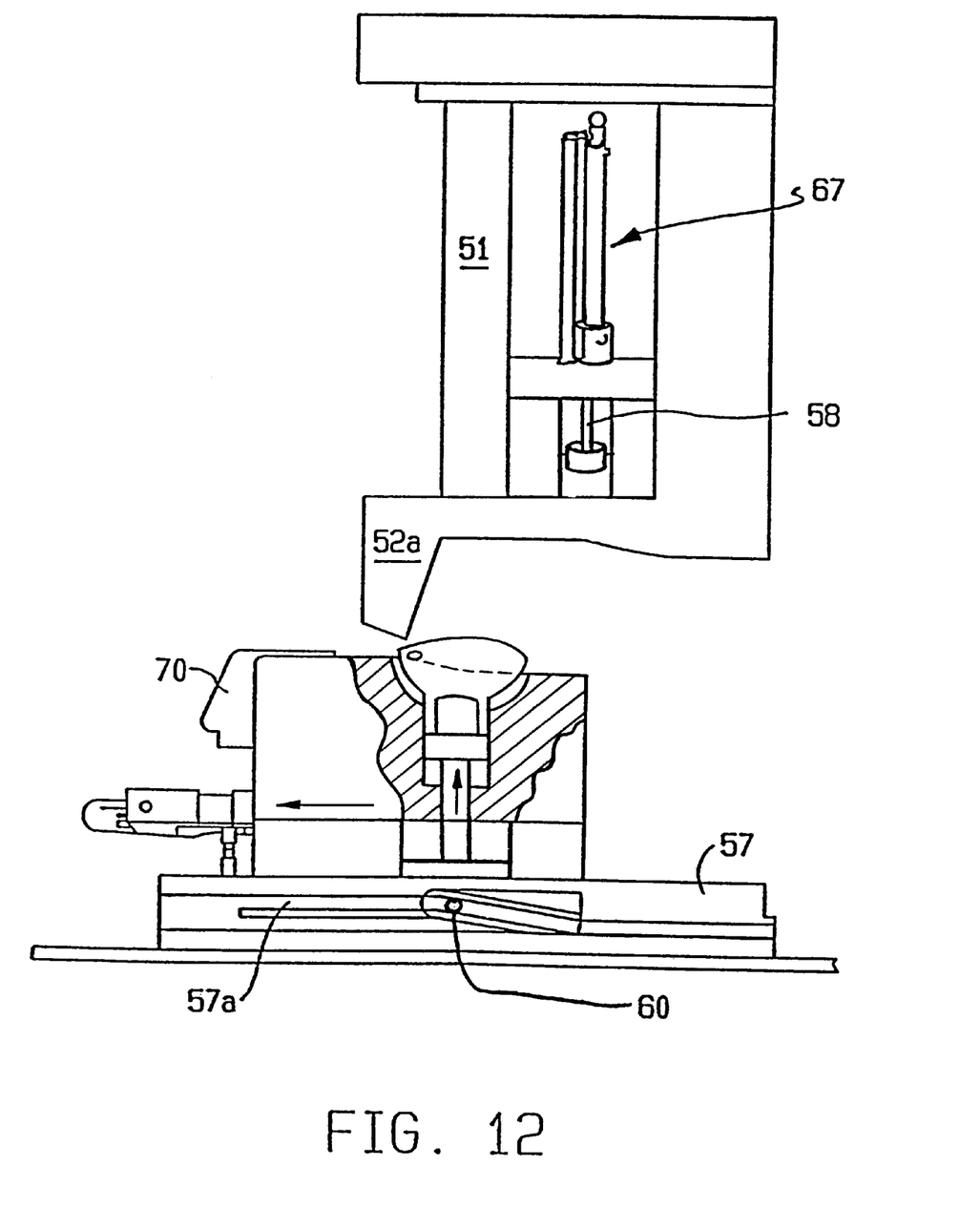
FIG. 12 is a view similar to FIG. 11 in which the upper mold has been raised and the lower mold partially moved along the track.
Figure 12A:
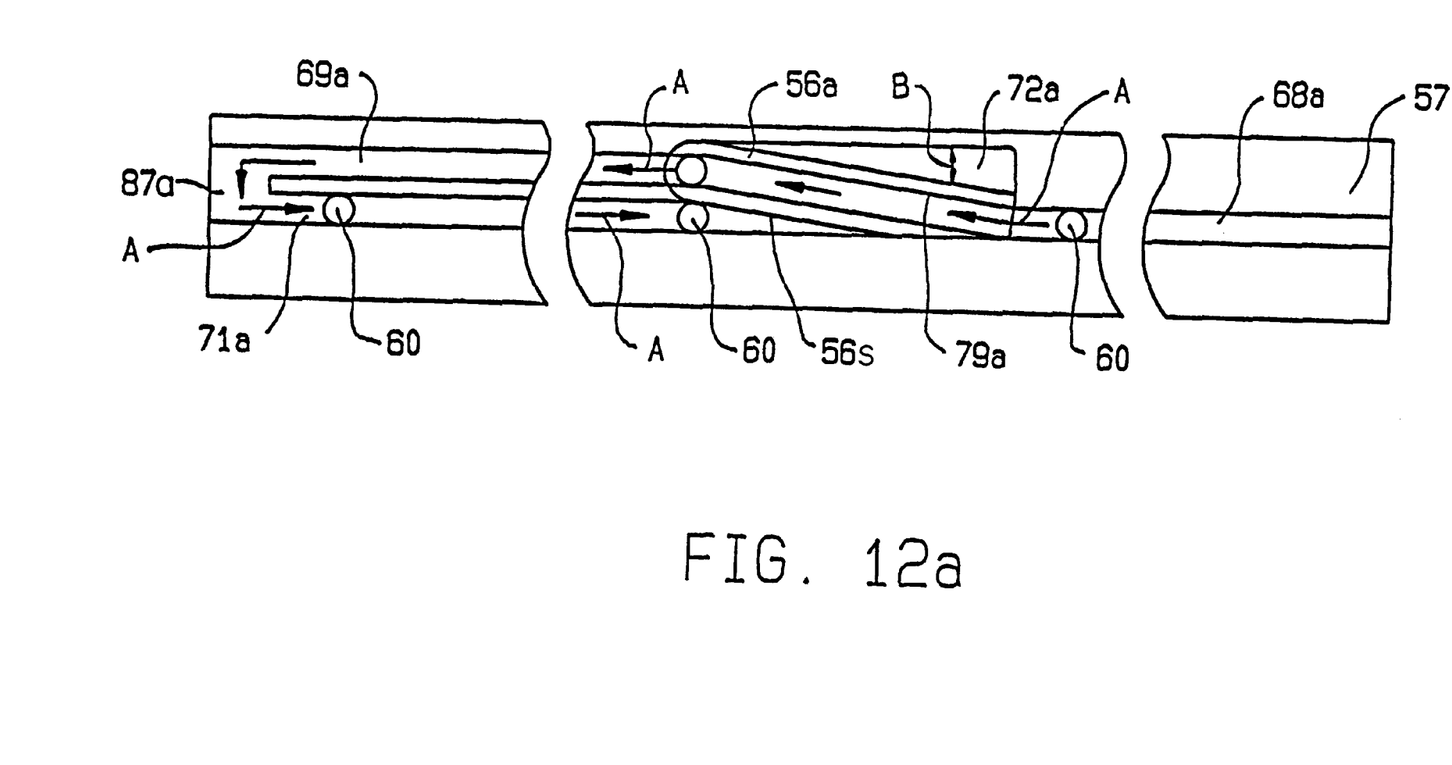
FIG. 12a is an enlarged side elevational view of the track rail of FIG. 12.
Figure 13:
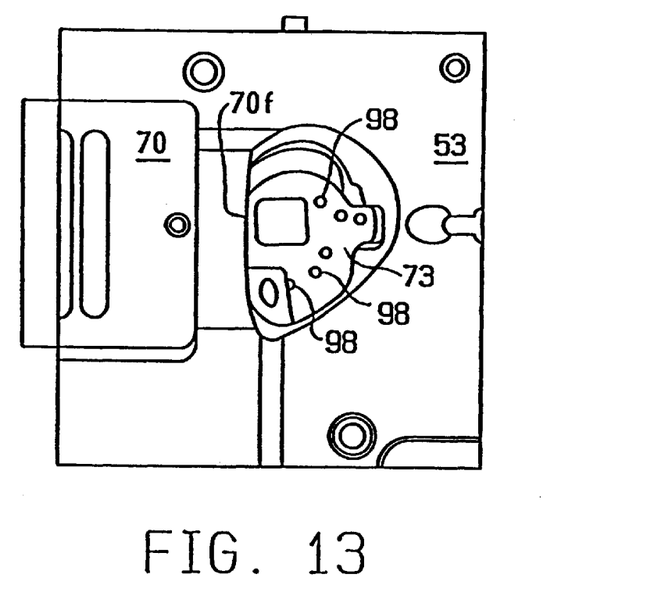
FIG. 13 is a top view of the lower mold.
Figure 14:
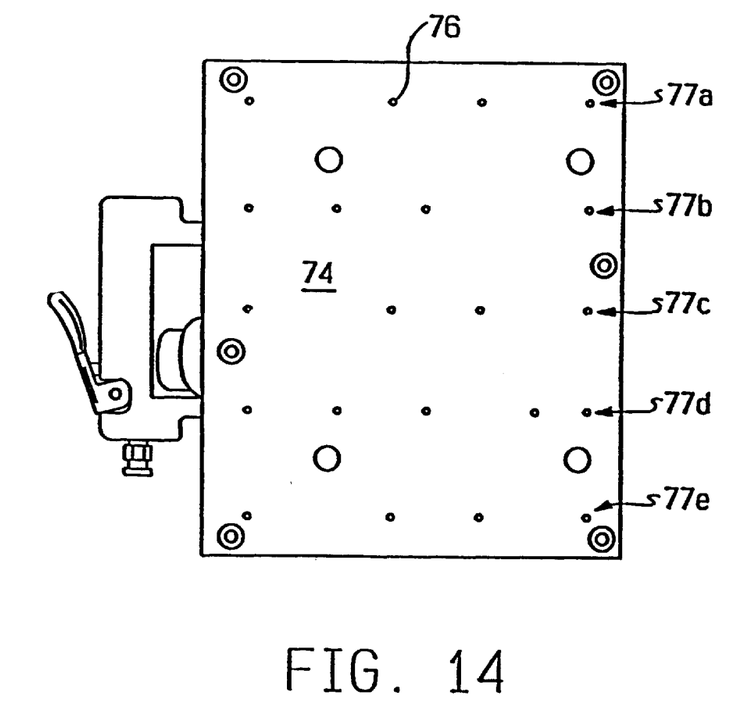
FIG. 14 is a bottom view of the lower mold.
Figure 15:
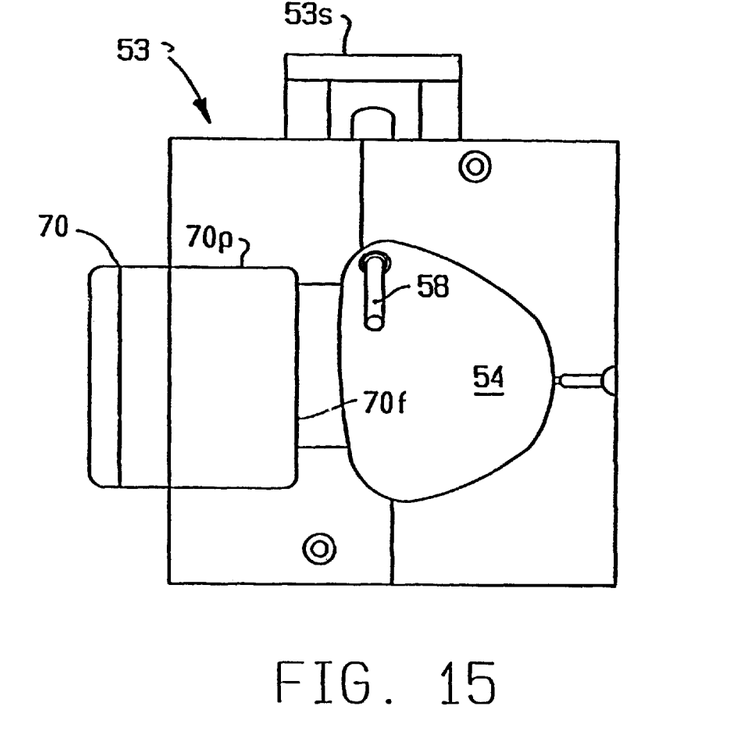
FIG. 15 is a bottom view of the upper mold.

Turning to FIGS. 10 to 1.2, mold press apparatus 50 operates to position mold sections described above for injection, for disassembly and reassembly which mold press 50 apparatus has an upper vertically reciprocal platen 51 to which the upper mold section 52 with beak section 52a is attached. Mold press apparatus 50 further includes a lower mold section 53 which is reciprocal in guide track 55 once separated from its upper mold section 52 from an injection position to a retracted position for disassembly and assembly. Movement of lower mold section 53 away from its upper mold section 52', as guided by track 55, is limited by stop piece 65. Pin hosel 58, which extends during operation into and occupies opening 54 (FIG. 15) to create a cylindrical void in the pattern being formed, is attached to a double acting air cylinder piston unit 67. Cylinder-piston unit 67 is mounted on platen 51. Track 55 includes spaced-apart guide left rail 56 and right rail 57 (as viewed in FIG. 10) with each rail 56, 57 including guide slots 68a, 68b forward upper guide slots 69a, 69b, forward lower guide slots 71a, 71b and spring-loaded ramp 56a (FIG. 12a). Spring-loaded ramp 56a having slot 79a is swingable in rail pocket 72a.

Lower mold section cross bar 59 positioned in opening 62 lower mold section 53 (FIG. 16) has cross bar 59 with right stud end 60 and left stud end 61 (not shown) which ends 60, 61 ride in guide slots 68a, 68b and 71a, 71b (FIG. 12a). Turning back to FIG. 12a, bar stud end 60 rides in a path indicated by arrows A during lower mold 53 movement toward stop piece 65 in guide slot 68a until it enters slot 79a of ramp 56a causing stud end 60 to be raised up into upper guide slot 69a and as it continues forward to pass into guide slot recess areas 87a, 87b. Stud end 60, under spring urging, then drops down into lower slot 71a for return. As stud end 60 engages ramp lower surface 56s of ramp 56a during such return it raises ramp 56a and continues rearward through slot 68a.

Figure 16:
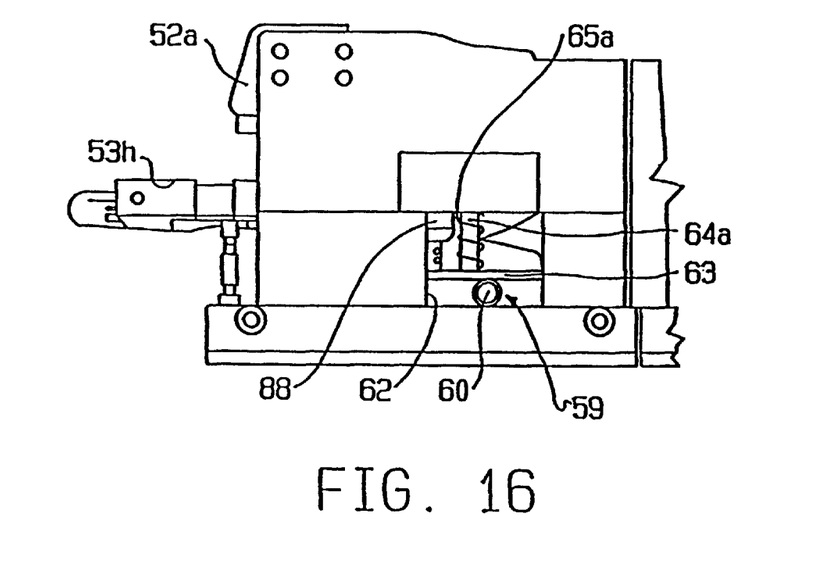
FIG. 16 is a side view of the lower mold.

Turning further to FIG. 16 lower mold section opening 62 houses support plate 63 which rides up and down on vertical rods 64a and 64b (not shown). Springs 65a, 65b urge plate 63 downwardly. Plate 63 engages and causes upward movement of center core unit 88 during the withdrawal of lower mold section 53 to its disassembly/assembly station adjacent stop piece 65 and simultaneously shears injection sprue. Plate 53 is raised by bar stud ends 60, 61 travelling in guide slots as described above. The raising and lowering of plate 63 under action of cross bar 59 with its ends 60, 61 is accomplished by the inclined groove system of FIG. 12a serving stud end 60 and a similar groove system in rail 56 serving stud end 61, all as explained above. Turning now to FIGS. 13–16, lower mold section 53 includes air cylinder stand-off portion 53s, a slide mold section 70 riding in slide pocket 70p having face 70f and core 73. When upper mold section 53 is raised its beak section 52a releases slide mold section 70 allowing it to move away from pattern (P) under force of a spring element (not shown). Lower mold section 53 further includes bottom surface 74 with a plurality of air (or other fluid) exit holes 76 arranged in rows 77a–e. Air exit holes 76 may be arranged in rows or any other pattern. Air exit holes 76 are connected to an air manifold (not shown).

When the core 73 is placed in lower mold section 13, six (6) rare earth magnets 98 (FIG. 13), aligned with core pins 95a–f, magnetically attract pins 95a–f in assuring the pins 95a–f are properly seated in lower mold section 53 against plate 63 (FIG. 16).

Figure 17:
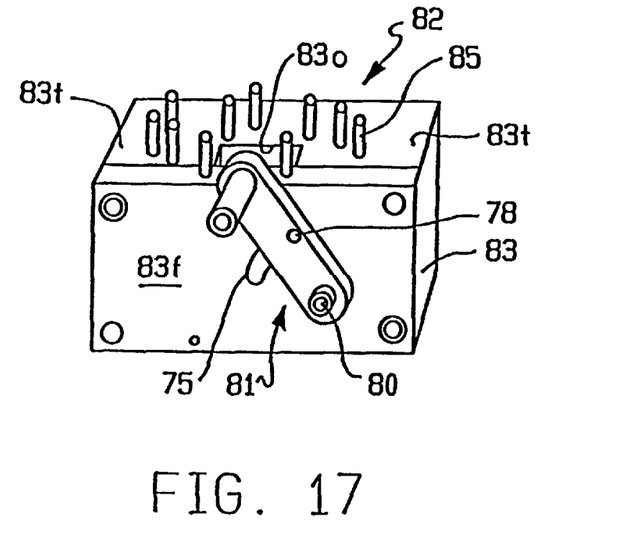
FIG. 17 is a perspective view of the portable core cluster stand with upstanding pins.
Figure 18:
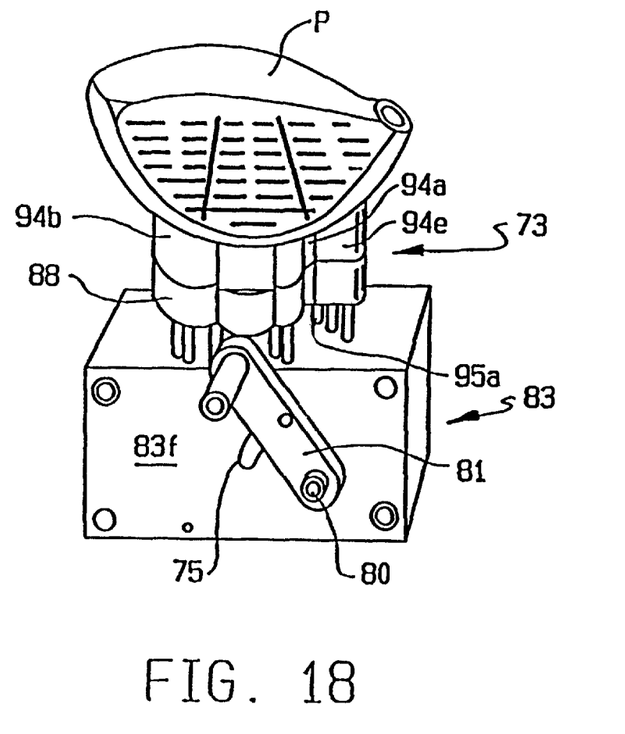
FIG. 18 is a perspective view of the stand with the cluster mounted thereon.
Figure 19:
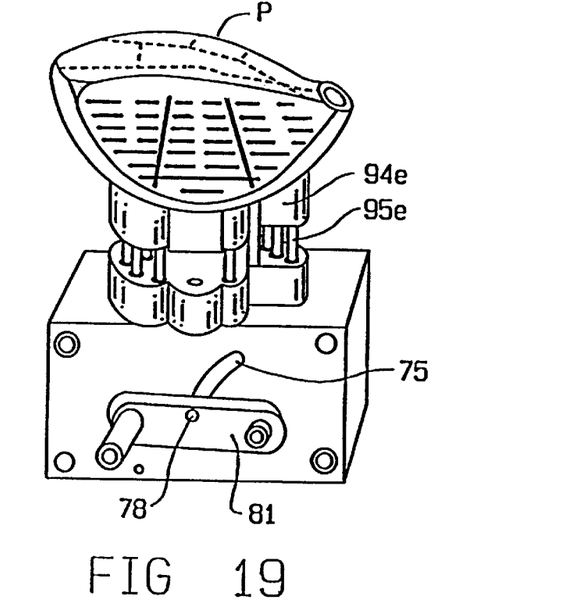
FIG. 19 is a perspective view of the stand with the cluster mounted thereon and the crank operated to lower the center core unit.
Figure 20:
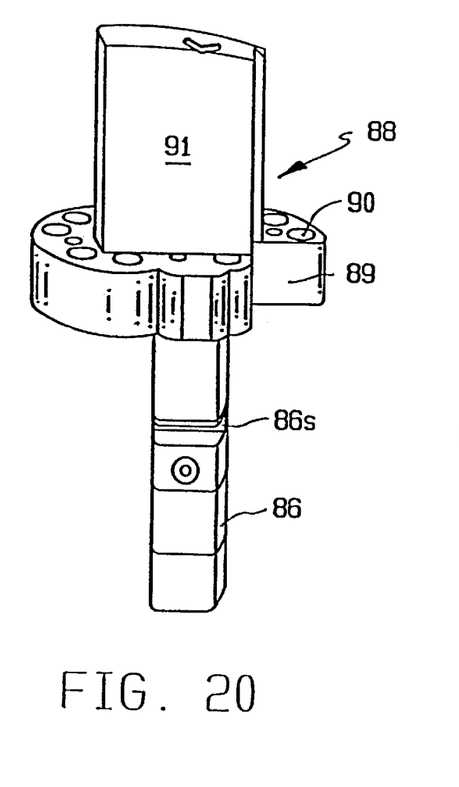
FIG. 20 is a perspective view of the center core unit.
Figure 20A:
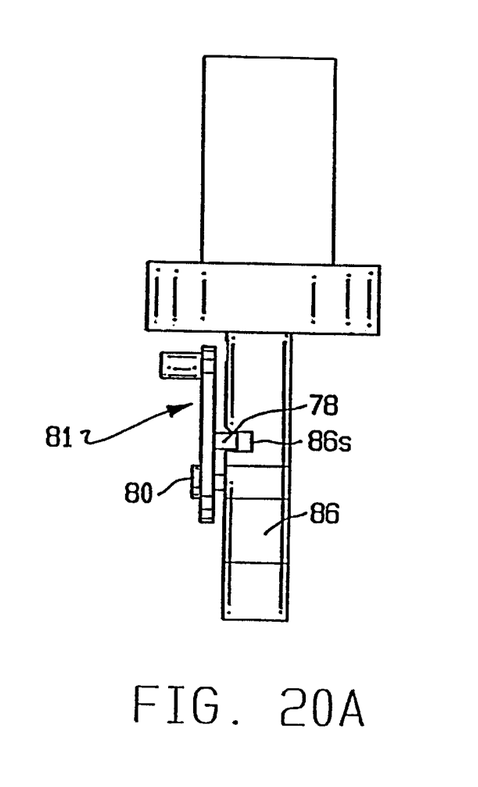
FIG. 20a is the side elevational view of the center core unit including its prong slot with the crank pin in engagement with the prong slot.

In FIGS. 17 and 18, a portable core cluster handling device 82 normally positioned on surface S of mold apparatus 50 (FIG. 10) includes body 83 with front panel 83f and top surface 83t. Upstanding pins 85 are mounted on top surface 83t and there is an opening 83o in top surface 83t to receive central core prong 86 of central core unit 88 (see FIG. 20). Device 82 has a crank 81 pivoted on pin 80 in front panel 83f. Crank 81 carries projecting cam pin 78 which projects through front face slot 75 into prong slot 86s. Pattern (P) is positioned on core cluster 73. Core 73 includes central core unit 88 which in turn also includes ring body 89 and central core 91. Ring body 89 includes holes 90 for receiving the pins 95a–f of core sections 94a–c (see FIGS. 18, 19 and also FIGS. 5 and 7).

In the operation of mold apparatus 50 and portable associated device 83, upon wax or other mold material injection into engaged mold sections 52, 53 through sprue hole (not shown) together with core pin 58 in place, pin 58 is withdrawn and upper platen 51 with its attached mold section 52, after a proper time delay, are raised. Preferably, this step of mold apparatus 50 and subsequent steps are automatically operated in a computer programmed control sequence. As upper mold section 52 moves up and away from lower mold slide section 70, mold slide section 70 is free under spring urging to move away from the molded pattern (P). Next, the operator grasps handle 53h and at the same time opens air handle valve 53v (FIG. 10) causing air to flow out lower mold bottom holes 76 providing an air cushion between the lower mold bottom surface 74 and the press table surface (S).

Lower mold section 53 is then pulled with ease on air cushion by the operator in direction D (FIG. 10). As lower mold section 53 moves toward stop piece 65, lower mold plate 63 is lifted due to the camming action of cross bar 59 with its stud ends 60, 61 as such stud ends 60,61 are cammed upwardly in guide slots 68, 68b, 69a, 69b and 71a, 71b causing core unit 88 to rise up (FIG. 12a). The sprue (not shown) is severed as core unit 88 rises. When stud ends 60, 61 reach the ends of slots 69a, 69b they drop down through recesses 87a, 87b under action of spring-loaded plate 63. Stud ends 60,61 are then free to move under slots 71a, 71b as mold section 53 is pushed by the operator back to its position for mating with upper mold 52. Core unit 88, having been raised by plate 63, is then readily grasped by the operator for removal. As core unit 88 is extracted the injection sprue is sheared off. Lubricant or cold air may be sprayed on the hosel pin 58 to reduce sticking.

The operator then places the wax pattern (P) with 15 the internal core cluster 73 on core cluster mount device 82. The center core 88 is extracted by operating crank 81. The projection pin 78 of crank 81 engages slot 86s of prong 86 to cause prong 86 to move downwardly as crank 81 is pushed down. As prong 86 is lowered by crank action, ring holes go accommodate upstanding pins 85 permitting downward movement until ring center cluster 89 is seated on device top surface 83f. Center core 88 is thereby separated from pattern (P) without the operator grasping pattern (P) which could cause its deformation. The remaining core sections are then readily removed by hand and places them on a pedestal for assembly.

We claim:

1. A method of molding a pattern using a multiple section mold including an upper mold section, a lower mold section with a slide piece and a core cluster a. vertically reciprocating the upper mold section away from the lower mold section;
   b. positioning the lower mold section including the slide piece and the core cluster on a horizontal control surface for translation movement;
   c. translating the lower mold section from a first molding position under the upper mold section to a second assembly position;
   d. causing a fluid cushion to be present under the lower mold section during translation;
   e. moving the lower mold section under and then engaging it to the upper mold section;
   f. injecting material into the mold;
   g. thereafter translating the lower mold section on the horizontal control surface to its second position after elevating the upper mold section;
   h. removing the core cluster; and
   i. placing the core cluster on a center core separation device.

2. The method of claim 1 having in addition the steps of
   a. providing track means for controlling and guiding the lower mold section during such translation and moving the lower mold section along the track means;
   b. providing guide means along the track means; and
   c. placing cam means on the lower mold section which ride in engagement with the guide means to raise the core cluster.

3. The method of claim 1 having in addition the steps of
   a. placing in the core Cluster a center core unit;
   b. mounting the core cluster in the center core unit; and
   c. separating the center core unit from the core cluster.

4. The method of claim 1 in which a sprue is formed on the pattern and shearing off the sprue when the translatable lower mold section is moved from its first molding, position to the second assembly position.

5. The method of claim 1 in addition providing a magnet in the lower mold section to attract the core cluster to the lower mold section.

6. A method for forming a mold pattern comprising
   a. providing an upper mold section;
   b. providing a lower mold section transportable along a surface from a molding position to a remote position;
   c. further providing a fluid cushion between the lower mold section and said surface;
   d. causing a core cluster to be positioned in the lower mold section; and
   e. supplying a guide track means for guiding the lower mold section during its transport from said molding position to said remote position for removal of the core cluster.

* * * * *